United States Patent
Allen et al.

(10) Patent No.: US 12,362,094 B2
(45) Date of Patent: Jul. 15, 2025

(54) LAMINATED MAGNETIC CORES

(71) Applicant: The Trustees of the University of Pennsylvania, Philadelphia, PA (US)

(72) Inventors: Mark George Allen, Philadelphia, PA (US); Min Soo Kim, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 18/670,518

(22) Filed: May 21, 2024

(65) Prior Publication Data

US 2024/0312703 A1 Sep. 19, 2024

Related U.S. Application Data

(62) Division of application No. 16/304,115, filed as application No. PCT/US2017/034511 on May 25, 2017, now Pat. No. 12,020,861.

(Continued)

(51) Int. Cl.
*H01F 41/02* (2006.01)
*H01F 17/04* (2006.01)
(Continued)

(52) U.S. Cl.
CPC ............ *H01F 41/02* (2013.01); *H01F 17/04* (2013.01); *H01F 27/245* (2013.01)

(58) Field of Classification Search
CPC ......... H01F 41/02; H01F 17/04; H01F 27/245
See application file for complete search history.

(56) References Cited

U.S. PATENT DOCUMENTS

| | | | | |
|---|---|---|---|---|
| 5,334,292 A | * | 8/1994 | Rajeshwar | H01B 1/127 252/514 |
| 5,435,903 A | * | 7/1995 | Oda | H05K 3/24 205/258 |

(Continued)

FOREIGN PATENT DOCUMENTS

| | | |
|---|---|---|
| CN | 1506399 A | 6/2004 |
| CN | 1514451 A | 7/2004 |

(Continued)

OTHER PUBLICATIONS

Restriction Requirement for U.S. Appl. No. 17/288,462 (Jun. 21, 2024).

(Continued)

*Primary Examiner* — Malcolm Barnes
(74) *Attorney, Agent, or Firm* — Jenkins, Taylor & Hunt, P.A.

(57) ABSTRACT

The subject matter described herein relates to laminated magnetic cores, methods of fabricating laminated magnetic cores, and electric devices using laminated magnetic cores. In some examples, a method for fabricating a laminated magnetic core includes depositing a first magnetic layer and depositing an interlamination layer of over the first magnetic layer. The interlamination layer comprises a partially conducting material having a conductivity greater than or equal to $10^{-4}$ S/cm and less than or equal to $10^5$ S/cm. The method includes depositing a second magnetic layer over the interlamination layer. The method can include sequentially depositing additional interlamination layers and additional magnetic layers in an alternating fashion to produce the laminated magnetic core.

11 Claims, 6 Drawing Sheets

Related U.S. Application Data

(60) Provisional application No. 62/341,826, filed on May 26, 2016.

(51) Int. Cl.
*H01F 27/24* (2006.01)
*H01F 27/245* (2006.01)

(56) References Cited

U.S. PATENT DOCUMENTS

| | | | | |
|---|---|---|---|---|
| 6,465,053 | B1* | 10/2002 | Lenssen | G01R 33/096 427/547 |
| 6,683,522 | B2* | 1/2004 | Walsh | H01F 17/0006 336/174 |
| 7,140,092 | B2 | 11/2006 | Park et al. | |
| 8,466,766 | B2* | 6/2013 | Carsten | H01F 3/14 336/213 |
| 12,020,861 | B2 | 6/2024 | Allen et al. | |
| 2002/0145416 | A1* | 10/2002 | Attarian | G01R 15/183 324/127 |
| 2004/0164839 | A1* | 8/2004 | Park | H01F 17/0013 336/234 |
| 2005/0001707 | A1* | 1/2005 | Elliott | H01F 17/06 336/200 |
| 2005/0083155 | A1* | 4/2005 | Attarian | G01R 15/183 335/18 |
| 2005/0105225 | A1* | 5/2005 | Ahn | H01L 23/645 257/E23.079 |
| 2005/0233593 | A1* | 10/2005 | Brunet | H05K 1/0219 |
| 2006/0192646 | A1* | 8/2006 | Hanley | H01F 17/06 336/200 |
| 2010/0239794 | A1* | 9/2010 | Andrews | H05K 3/046 428/32.72 |
| 2010/0254168 | A1* | 10/2010 | Chandrasekaran | H01F 30/06 336/170 |
| 2013/0002392 | A1* | 1/2013 | Parashar | H01F 27/245 977/773 |
| 2013/0224887 | A1* | 8/2013 | Lee | C23C 28/34 257/E43.006 |
| 2013/0229841 | A1* | 9/2013 | Giuliano | H02M 1/0043 363/60 |
| 2014/0061853 | A1* | 3/2014 | Webb | H01L 23/5227 336/200 |
| 2014/0062646 | A1* | 3/2014 | Morrissey | H01F 27/24 257/421 |
| 2015/0200231 | A1 | 7/2015 | Herget et al. | |
| 2015/0332825 | A1* | 11/2015 | Tera | H01F 3/14 336/178 |
| 2015/0357300 | A1* | 12/2015 | Saito | H10F 39/811 257/737 |
| 2015/0371756 | A1* | 12/2015 | Sturcken | H01F 27/2823 336/200 |
| 2016/0005530 | A1* | 1/2016 | Kubík | H01F 17/0033 336/182 |
| 2017/0169929 | A1* | 6/2017 | Kubik | H01F 41/041 |
| 2017/0169944 | A1* | 6/2017 | Koo | H01F 41/06 |
| 2018/0286582 | A1 | 10/2018 | Deligianni et al. | |
| 2018/0308921 | A1 | 10/2018 | Deligianni et al. | |
| 2018/0323158 | A1 | 11/2018 | Deligianni et al. | |
| 2019/0252116 | A1 | 8/2019 | Deligianni et al. | |
| 2020/0168374 | A1 | 5/2020 | Deligianni et al. | |
| 2020/0335275 | A1 | 10/2020 | Allen et al. | |
| 2021/0383958 | A1 | 12/2021 | Allen et al. | |

FOREIGN PATENT DOCUMENTS

| | | | |
|---|---|---|---|
| CN | 103681633 | A | 3/2014 |
| CN | 104064318 | A | 9/2014 |
| CN | 204425811 | U | 6/2015 |
| CN | 105074893 | A | 11/2015 |
| CN | 106876111 | A | 6/2017 |
| EP | 1 576 205 | B1 | 1/2009 |
| EP | 3455864 | A1 | 3/2019 |
| EP | 3455864 | B1 | 10/2024 |
| GB | 1515565 | A | 6/1978 |
| JP | 03227505 | A * | 10/1991 ............. B82Y 25/00 |
| JP | H03 227505 | A | 10/1991 |
| WO | WO-87/04559 | | 7/1987 |
| WO | WO 00/44006 | | 7/2000 |
| WO | WO-2017/205644 | A1 | 11/2017 |

OTHER PUBLICATIONS

Notice of Intent to Grant for European Patent Application Serial No. 17803599.4 (May 14, 2024).
Result of Consultation European Patent Application Serial No. 17803599.4 (Mar. 20, 2024).
Notice of Allowance/AFCP 2.0 Decision/Examiner-Initiated Interview Summary for U.S. Appl. No. 16/304,115 (Feb. 22, 2024).
Summons to attend Oral Proceedings for EP 17803599,4 dated Nov. 3, 2023.
Final Office Action for U.S. Appl. No. 16/304,115 (Oct. 2, 2023).
Non-Final Office Action for U.S. Appl. No. 16/304,115 (May 11, 2023).
Advisory Action for U.S. Appl. No. 16/304,115 (Apr. 5, 2023).
Final Office Action for U.S. Appl. No. 16/304,115 (Dec. 16, 2022).
Chinese Office Action for CN 201980086236.2 dated Oct. 9, 2022.
Communication of the extended European search report for European Patent Application Serial No. 19875717.1 (Jul. 15, 2022).
Non-Final Office Action for U.S. Appl. No. 16/304,115 (Jul. 7, 2022).
Restriction Requirement for U.S. Appl. No. 16/304,115 (Mar. 25, 2022).
Office Action for European Patent Application Serial No. 17803599.4 (Dec. 19, 2021).
Notice of Publication for U.S. Appl. No. 17/288,462 (Dec. 10, 2021).
Communication of European publication number and information on the application of Article 67(3) EPC for European Patent Application Serial No. 19875717.1 (Aug. 4, 2021).
Commonly-Assigned, Co-pending U.S. Appl. No. 17/288,462 for "Patterned Magnetic Cores," (Unpublished, filed Apr. 23, 2021).
Notification of Transmittal of the International Search Report and the Written Opinion of the International Searching Authority, or the Declaration of International Application No. PCT/US19/58288 (Jan. 14, 2020).
Communication of the Extended European Search Report for European Patent Application Serial No. 17803599.4 (Dec. 19, 2019).
Notification of the First Office Action for Chinese Patent Application Serial No. 201780041759.6 (Dec. 18, 2020).
Commonly-Assigned, Co-pending U.S. Appl. No. 16/304,115 for "Laminated Magnetic Cores," (Unpublished, filed Nov. 21, 2018).
Notification of Transmittal of the International Search Report and the Written Opinion of the International Searching Authority, or the Declaration for International Application No. PCT/US2017/034511 (Aug. 14, 2017).
Anthony et al., "MEMS based on electrochemical process for fabrication of laminated micro-inducers on silicon," Microelectronic Engineering, vol. 155, pp. 33-38 (2016).
Kim et al., "Microfabrication of toroidal inductors integrated with nanolaminated ferromagnetic metallic cores," J. Micromech. Microeng., vol. 23, pp. 1-9 (2013).
Kim et al., "Nanolaminated Permalloy Core for High-Flux, High-Frequency Ultracompact Power Conversion," IEEE Transactions on Power Electronics, vol. 26, No. 9, pp. 1-8 (Sep. 2013).
Kim et al., "A MEMS lamination technology based on sequential multilayer electrodeposition," J. Micromech. Microeng., vol. 23, pp. 1-10 (2013).
Bazzaoui et al., "Sweet aqueous solution for electrochemical synthesis of polypyrrole part 1B: On copper and its alloys," Electrochimica Acta, vol. 52, pp. 1-14 (2007).
Bewley et al., "Intersheet Eddy-Current Loss in Laminated Cores," Electrical Engineering, pp. 344-346 (Mar. 1937).
Decision to Grant for European Patent Application Serial No. 17803599.4 (Sep. 26, 2024).

(56) References Cited

OTHER PUBLICATIONS

Non-Final Office Action for U.S. Appl. No. 17/288,462 (Oct. 1, 2024).
Notice of Allowance for U.S. Appl. No. 17/286,462 (Feb. 13, 2025).
Kim, et al., "Interlamination Insulation Design Considerations For Laminated Magnetics Operating At High Frequencies", IEEE, pp. 1-10 (2015).
U.S. Appl. No. 12/334,239, filed Jun. 17, 2025, Allen et al.

* cited by examiner

LAMINATED MAGNETIC CORES

PRIORITY CLAIM

This application is a divisional of U.S. patent application Ser. No. 16/304,115, filed Nov. 21, 2018, which is a national stage filing of PCT International Application No. PCT/US2017/034511, filed May 25, 2017, which claims benefit of U.S. Provisional Application Ser. No. 62/341,826, filed May 26, 2016, the disclosures of which are herein incorporated by reference in their entireties.

TECHNICAL FIELD

The subject matter described herein relates generally to laminated magnetic cores. More particularly, the subject matter described herein relates to laminated magnetic cores, methods of fabricating laminated magnetic cores, and electric devices using laminated magnetic cores.

BACKGROUND

In general, electrically conducting magnetic materials exhibit superior magnetic properties compared to their r non-electrical conducting counterparts; however, substantial eddy current losses at high operating frequencies (e.g., the typical 0.1-10 MHz frequencies used in DC-DC converters, battery chargers, and handheld devices, and higher frequencies (10-100 MHz) that may be utilized in future power systems-on-chip (PwrSOC) with integrated magnetics) where the skin depths of the materials are smaller than the thickness of the magnetic material limit the use of these materials. By creating stacks of micron or sub-micron thick layers of thin magnetic alloy sheets ('laminations') with interlamination layers of extremely low conductivity, the eddy current losses within the volume of the laminated alloys can be suppressed even at MHz frequencies; such conventionally insulated laminations are ideal for the realization of magnetic materials for high operating frequencies.

Conventionally insulated laminations can present fabrication issues. In view of these issues, there exists a need for improved laminated magnetic cores, methods of fabricating laminated magnetic cores, and electric devices using laminated magnetic cores.

SUMMARY

This document describes laminated structures comprising interlamination layers with balanced electrical conductivities, typically ranging between four to six orders of magnitude lower than the metallic magnetic material. The laminated structures can be useful for, e.g., (1) uncompromised high frequency performance at (2) significantly lower fabrication complexity. This is achieved when the conductivities of the interlamination layers are sufficiently high to enable subsequent electrodeposition of metal (e.g., the next lamination layer), and yet sufficiently low that the eddy current losses within the fabricated laminated alloys are sufficiently suppressed for a particular application of interest. For example, suppression of eddy current losses to levels significantly lower than other losses in the magnetic system or electrical system in which the magnetic system is embedded may only be of marginal benefit. Examples of such other losses include the hysteresis losses of the magnetic layers, i.e., the losses due to the magnetization process intrinsic to the magnetic material, or losses in an overall electrical system in which the magnetic system is a part, such as the switching loss in an electrical power converter. Thus, interlamination layer electrical conductivities that are larger than zero may be permissible.

The laminated structures and methods of fabrication can be useful for, e.g., the commercialization of miniaturized inductive components (such as inductors and transformers) operating at high frequencies (e.g., exceeding 0.1 MHz). By using the laminated magnetic cores of which saturation flux densities are higher than that of the commercially-available ferrite cores, the form factors of related end-products (e.g. switch-based DC-to-DC power converters, circuit isolators, handheld electronic devices, LED lights) could be significantly reduced.

The subject matter described herein relates to laminated magnetic cores, methods of fabricating laminated magnetic cores, and electric devices using laminated magnetic cores. In some examples, a method for fabricating a laminated magnetic core includes depositing a first magnetic layer and depositing an interlamination layer of over the first magnetic layer. The interlamination layer comprises a partially conducting material having a conductivity greater than or equal to $10^{-4}$ S/cm and less than or equal to $10^5$ S/cm. The method includes depositing a second magnetic layer over the interlamination layer. The method can include sequentially depositing additional interlamination layers and additional magnetic layers in an alternating fashion to produce the laminated magnetic core.

DETAILED DESCRIPTION

Figure 1A:
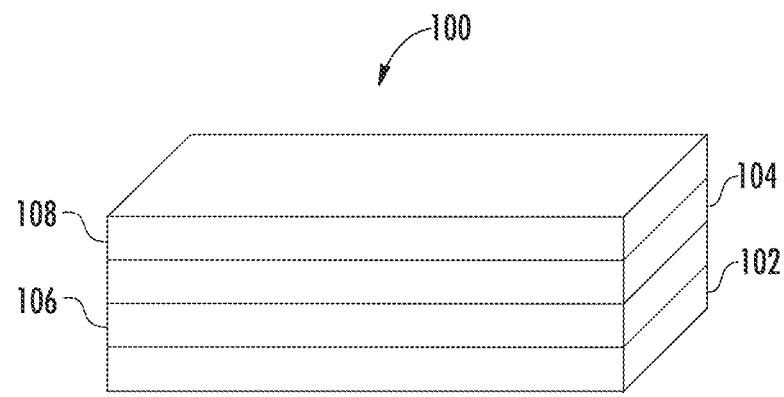
FIGS. 1A-1B illustrate an example laminated magnetic core.
Figure 1B:
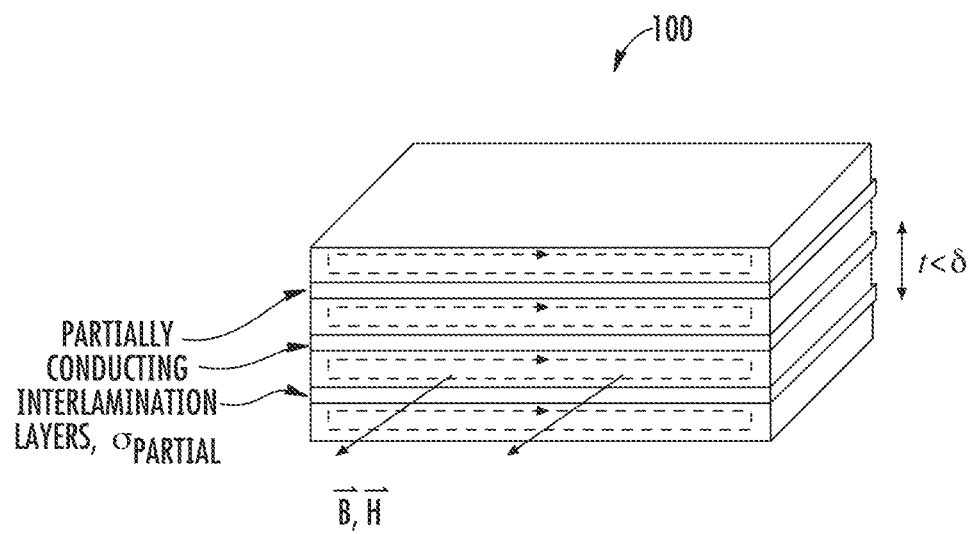

FIGS. 1A-1B illustrate an example laminated magnetic core 100. FIG. 1A shows that laminated magnetic core 100 includes magnetic layers 102 and 104 and interlamination layers 106 and 108 disposed between the magnetic layers in an alternating fashion. Interlamination layers 106 and 108 are formed of a partially conducting material. For example, the partially conducting material can have a conductivity greater than or equal to $10^{-4}$ S/cm and less than or equal to $10^5$ S/cm. In some examples, the partially conducting material has a conductivity between 0.1 S/cm and 10 S/cm.

In some examples, magnetic layers 102 and 104 are formed of a soft magnetic alloy, e.g., Ni, Fe, NiFe, NiFeCo, or similar materials, and interlamination layers 106 and 108 are formed of a material of significantly smaller electrical conductivity such as conductive polymers, e.g., polypyrrole. In some examples, magnetic layers 102 and 104 each have a thickness less than or equal to 10 μm and greater than or equal to 0.1 μm, and interlamination layers 106 and 108 each have a thickness less than or equal to 1 μm and greater than or equal to 0.1 μm.

FIG. 1B shows the suppressed eddy currents that conduct within laminated magnetic core 100. FIG. 1B also illustrates the magnetic fields and an appropriate thickness of the magnetic layers relative to the skin depth of the magnetic material. The appropriate thickness of each individual layer is a function of multiple physical and technical parameters, such as the conductivity of the lamination layer or the interlamination layer or both, the magnetic permeability of a ferromagnetic material in the magnetic layers, and the range of frequency at which an electric device is configured to operate.

In some examples, the skin depth and the conductivities of the layers can be used as follows:

$$\text{Skin depth} = \delta = \sqrt{\frac{1}{\pi f \mu \sigma_m}}$$

where f is the operating frequency in Hz, μ is the layer permeability in H/m, $\sigma_m$ is the conductivity of the material of interest in S/m, and δ is the skin depth in m. Typical conductivities of metallic magnetic materials might be on the order of $10^5$ S/cm, while typical conductivities of conventional insulating materials for interlamination layers might be as low as the order of $10^{-16}$ S/cm, and conductivities of partially insulating interlamination layers might range from $10^{-4}$ S/cm up to conductivities approaching that of metallic magnetic materials.

The advantages of laminated magnetic core 100 compared to conventional laminations with conventionally insulating interlamination layers can include (1) uncompromised high frequency performance (2) at reduced fabrication complexity.

The conductivity of interlamination layers 106 and 108 is balanced so that it is (1) sufficiently high for a subsequent electrodeposition of the desired magnetic material on the interlamination layer, yet (2) sufficiently low compared to the magnetic material to suppress the interlamination conduction to a proper level; hence, the fabrication of the laminated alloys is simplified to sequential electrodeposition of magnetic layers and partially-conducting interlamination layers. The total eddy current losses within such laminated materials can be suppressed to a desired level, e.g., the level of the hysteresis losses of the magnetic layers, i.e., the losses due to the magnetization process intrinsic to the magnetic material. Laminated magnetic core 100 provides a simple, cost-effective and environment-friendly fabrication approach toward the batch-scale realization of laminated magnetic alloys with nearly uncompromised performances.

Figure 2:
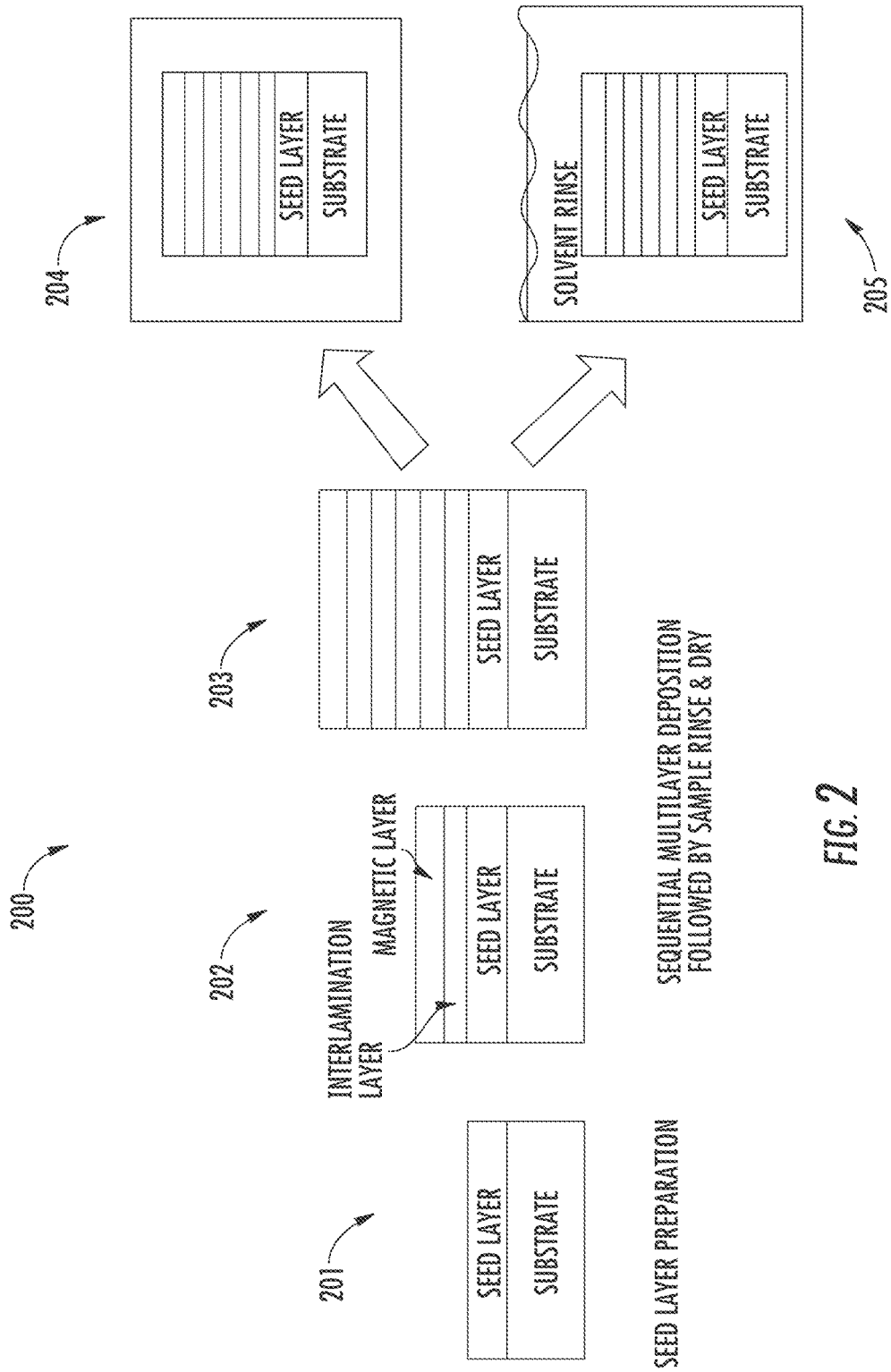
FIG. 2 is a diagram illustrating an example method for fabricating a laminated magnetic core.

FIG. 2 is a diagram illustrating an example method 200 for fabricating a laminated magnetic core. Method 200 is based on a sequential multilayer electrodeposition of desired magnetic alloy and properly-chosen conductive polymer (e.g. polypyrrole). Using conductive polymer as interlamination layer material is beneficial in at least two aspects.

First, polymers with extremely wide ranging conductivities (e.g. $10^{-3}$-$10^3$ S/cm) can be synthesized by using appropriate monomers and dopants. Second, the gradual post-deposition conductivity degradation of the polymers stored in ambient conditions, which is widely observed in common conductive polymer systems and unfavorable for most applications, may be beneficial from the perspective of retaining superior performance of the laminated magnetic alloys for an extended period of time. In some examples, this effect is accelerated by subsequent, post-electrodeposition polymer degradation processes such as sample heating at elevated temperatures, or solvent rinsing.

Method 200 includes preparation of a seed layer (201). Method 200 includes anodic electropolymerization of a desired conductive polymer followed by cathodic electrodeposition of a desired metal (such as a magnetic material), or vice versa (202). In some examples, a magnetic layer is deposited over the seed layer, e.g., as shown in FIG. 2; in some other examples, an interlamination layer is deposited over the seed layer. Method 200 includes repeatedly adding layers in an alternating fashion to fabricate multilayers with designed individual layer thicknesses (203). Method 200 optionally includes a sample rinse and dry (204). Method 200 optionally includes polymer degradation processes such as heating, or solvent treatment (sample rinsing, immersion) (205). Method (200) optionally includes the application of a magnetic field during electrodeposition of the magnetic material to preferentially improve the magnetic properties of the magnetic material.

The seed layer, on which the laminated magnetic alloys are synthesized, is prepared on an arbitrary substrate. The seed layer can be metal (e.g. gold, silver, nickel, copper, aluminum, zinc, iron) as well as non-metal (e.g. indium tin oxide (ITO), graphite, graphene, carbonized SU-8 epoxy, highly doped silicon), as long as its conductivity is sufficient to perform step 2. The seed layer can be prepared by various means including both physical deposition (e.g. sputtering, evaporation) and chemical deposition (e.g. electroless deposition).

The electropolymerization of a conductive polymer is performed in an aqueous bath where a proper amount of the monomers of the desired polymers and salts are dissolved. Various monomers (e.g. 3,4-ethylenedioxythiophene (EDOT), aniline, and pyrrole) can be used to synthesize respective polymers (e.g., poly(3,4-ethylenedioxythiophene) (PEDOT), polyaniline, and polypyrrole). Note that the choice of both monomers and salts is appropriate for method 200 when the conductivity of the deposited polymer is balanced so that the interlamination layer conductivities are sufficiently high to enable the electrodeposition of magnetic layers, and yet sufficiently low to suppress the interlamination conduction within the laminated structure (or, alternatively, can be made low by post-deposition treatment).

An anodic potential during the electropolymerization might lead to an undesirable corrosion of the underlying layer (i.e. metallic seed layer or electrodeposited metallic magnetic layers); specific salts (e.g. sodium oxalate, sodium tartrate, sodium saccharin, sodium salicylate) that are co-dissolved in the bath may help creating a passivation layer on the substrate during the first few seconds of the polymerization, which inhibits the substrate corrosion. As an alternative to conducting polymer electrodeposition, other deposition techniques, such as dip, spin, or spray coating, could be used to deposit the desired conducting polymer.

The cathodic electrodeposition of a desired metal is performed on the deposited conductive polymer layer. Various common soft magnetic metal alloys (e.g. Ni alloys such as NiFe, CoNiFe, NiFeMo) can be directly deposited on the polymer layer using appropriately-designed electrolyte baths and deposition conditions; however, for some metals, their relatively high cathodic deposition potential may attract significant amount of the dissolved anion to the polymer network, expanding the volume of the polymer matrix that leads to an undesirable film delamination during the deposition. This issue can be resolved by pre-electrodeposition of a low deposition potential metal film (e.g. copper, nickel) with a thickness much smaller than the lamination thickness.

Figure 3A:
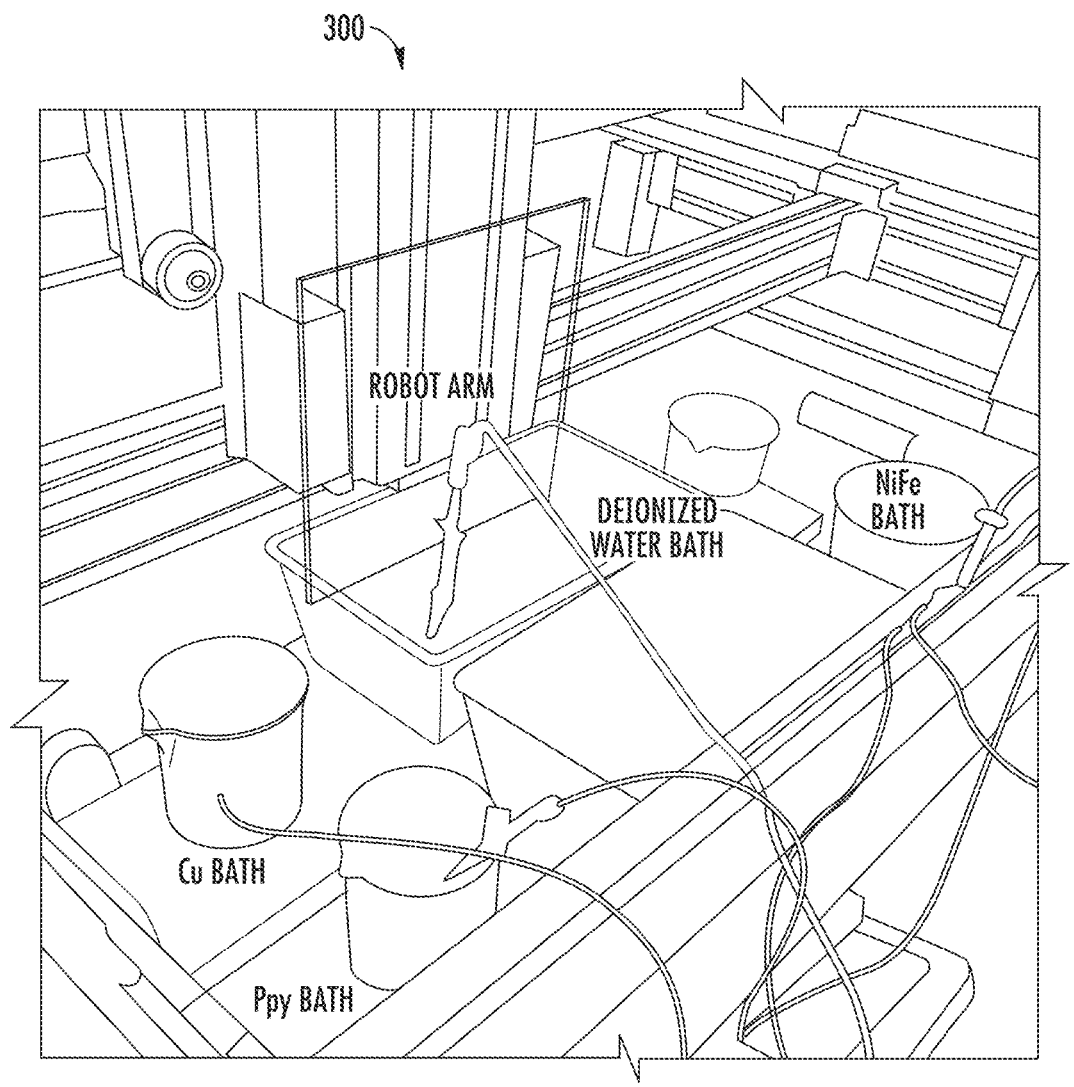
FIG. 3A illustrates an example fabrication environment.

FIG. 3A illustrates an example fabrication environment 300 for method 200 including a robot arm of an electrodeposition robot that automatically transfers a sample wafer from bath to bath. Both deposition reactions are performed at appropriately-designed, fixed potentials (in relative to a reference electrode) or electrical currents, while the deposition time in the respective bath is controlled to achieve individual layers with desired thicknesses.

Large numbers of laminated magnetic alloys with desired individual layer thicknesses can be created. The lateral extent of the laminated alloys can be defined either by top-down machining (e.g. laser cutting) post deposition, or bottom-up through-mold electrodeposition using an appropriate mold material that is intact throughout the multilayer deposition (e.g. SU-8 or other photoresists). Any polymer degradation processes (such as oxidative degradation processes at elevated temperatures, or solvent-induced degradation processes) that lead to the decrease of the conductivity of the deposited polymer may follow as long as the magnetic properties of the deposited magnetic alloys are not substantially negatively impacted.

Figure 3B:
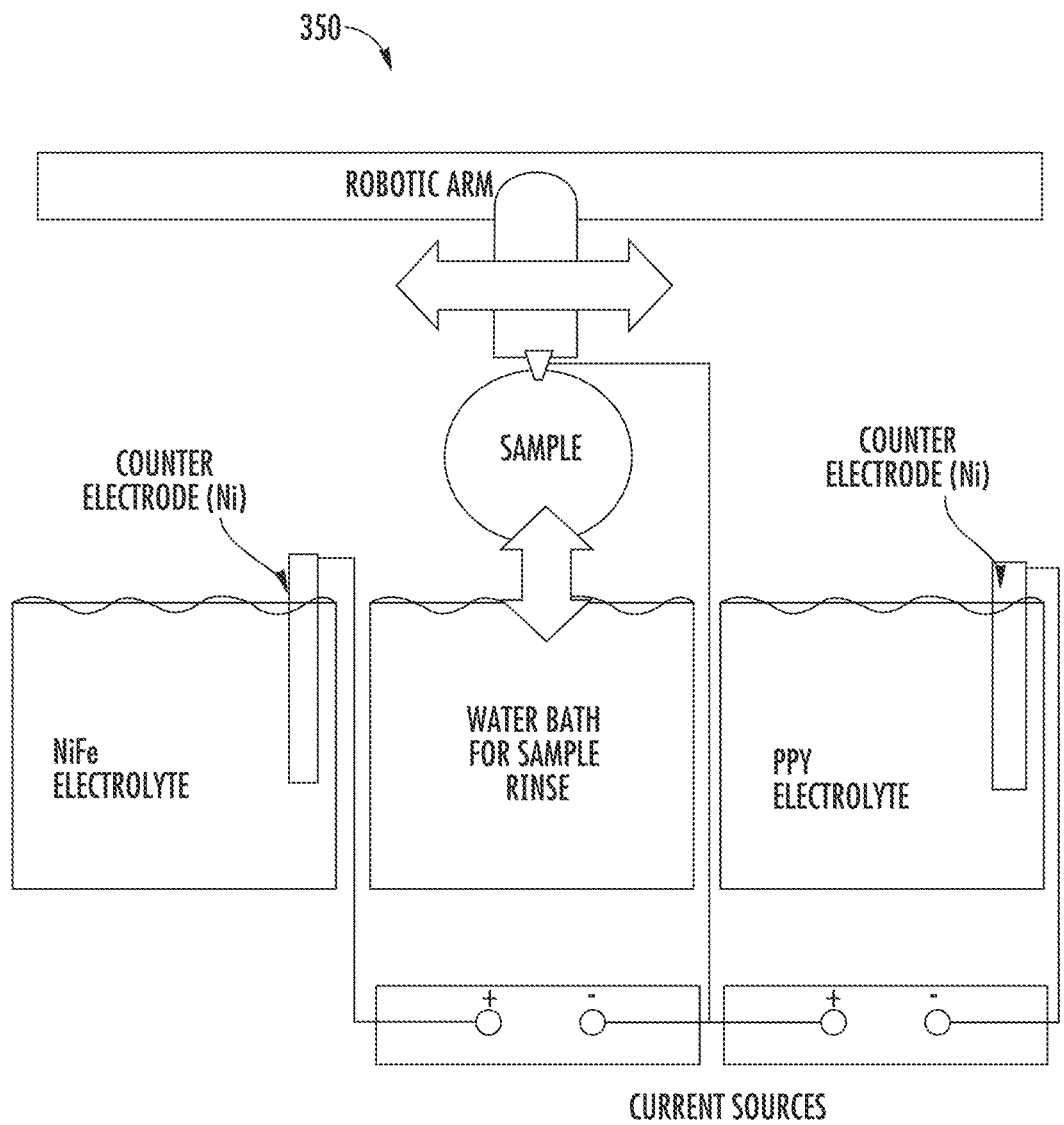
FIG. 3B is a block diagram of an example automated, robot assisted multibath electrodeposition setup.

FIG. 3B is a block diagram of an example automated, robot assisted multibath electrodeposition setup. Magnetic and polymeric (i.e. polypyrrole, or PPY) layers are sequentially deposited in the respective baths. After depositing a material, the sample is moved to the water bath to avoid bath cross-contamination. Note that the sample is under positive potential (compared to the counter electrode) to perform anodic polymerization.

Figure 4B:
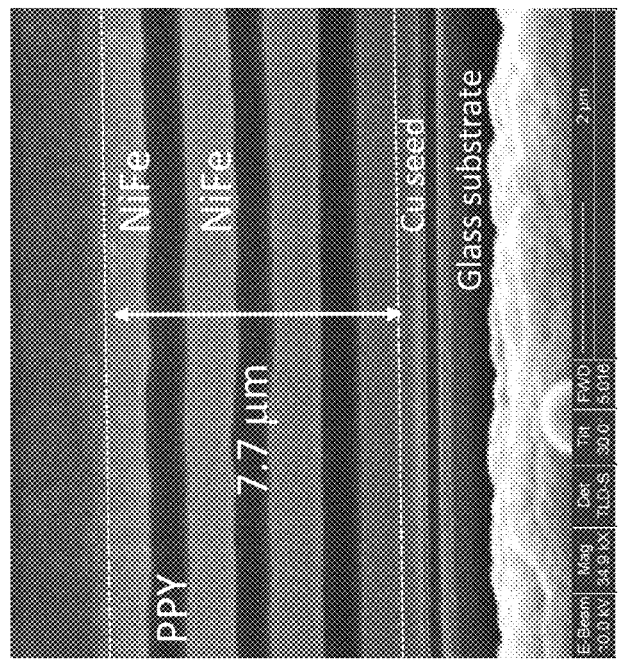
FIGS. 4A and 4B show an example of fabricated laminated alloys.
Figure 4A:
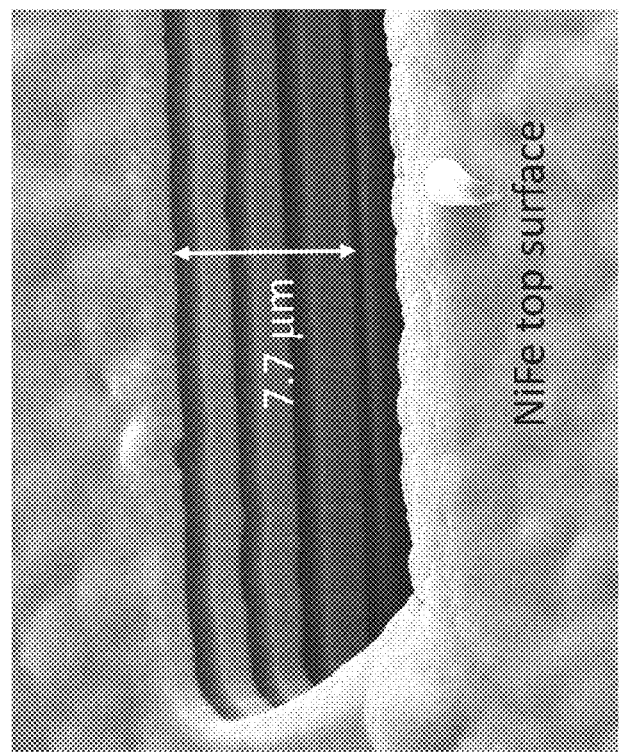

FIGS. 4A and 4B show an example of fabricated laminated alloys. This material comprises 4 layers of 1 µm-thick permalloy ($Ni_{80}Fe_{20}$, a representative soft magnetic metallic alloy) with 3 layers of 1 µm-thick polypyrrole interlamination. The deposition bath for the polymer is comprised of pyrrole and sodium salicylate. The conductivity of the polypyrrole measured using 4 point probe is approximately 1 S/cm, which is nearly 5 orders of magnitude smaller than the conductivity of the magnetic material, yet still conductive enough to perform multilayer electrodeposition.

Figure 5A:
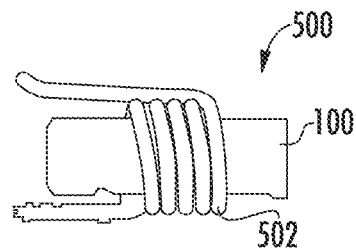
FIGS. 5A-C illustrate example electric devices that can use the laminated magnetic core.
Figure 5B:
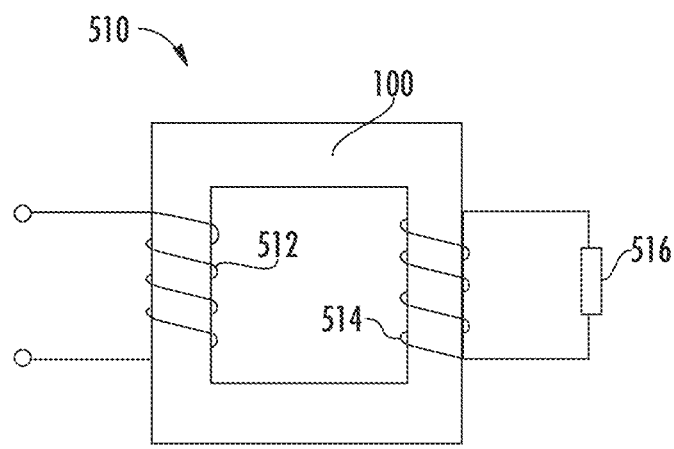
Figure 5C:
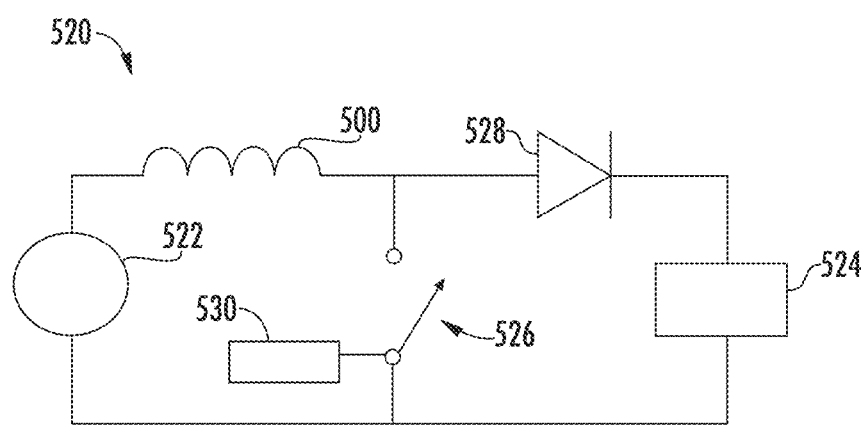

FIGS. 5A-C illustrate example electric devices that can use the laminated magnetic core 100. Various electric devices can use the laminated magnetic core 100 and the illustrated devices are presented for purposes of illustration.

FIG. 5A shows an example inductor 500 that includes laminated magnetic core 100 and a wire 502 coiled around laminated magnetic core 100. Inductors can be made of various sizes and shapes to fit particular applications.

FIG. 5B shows an example transformer 510 that includes laminated magnetic core 100. In this example, laminated magnetic core 100 has been fabricated as a rectangle with a rectangular hole to permit wrapping a primary winding 512 and a secondary winding 514 about laminated magnetic core 100. Transformer 510 transfers electrical energy from an input coupled to primary winding 512 to a load 516 coupled to secondary winding 514.

FIG. 5C shows an example switched-mode power converter 520. Switched-mode power converter 520 is coupled at an input to an electrical source 522, and switched-mode power converter 520 is configured to convert power from source 522 to a load 524 coupled at an output. Switched-mode power converter 520 includes a switch 526 and inductor 500 coupled between the input and switch 526. Switched-mode power converter 520 also includes a switch controller 530 configured to modulate switch 526 at a frequency exceeding 0.1 MHz (for example, at a frequency in the range between 0.1 MHz and 10 MHz, or up to higher frequencies such as 40 MHz and, in some examples, up to 100 MHz). Switch controller 530 can be configured to operate switched-mode power converter 520 as a DC-DC converter and to regulate an output voltage to load 524.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for fabricating a laminated magnetic core, the method comprising:
   depositing a first magnetic layer;
   depositing an interlamination layer over the first magnetic layer, wherein the interlamination layer comprises a partially conducting material having a conductivity greater than or equal to $10^{-4}$ S/cm and less than or equal to $10^5$ S/cm; and
   depositing a second magnetic layer over the interlamination layer.

2. The method of claim 1, comprising preparing a seed layer on a substrate and depositing the first magnetic layer on the seed layer.

3. The method of claim 1, comprising sequentially depositing a plurality of additional interlamination layers and a plurality of additional magnetic layers in an alternating fashion to produce the laminated magnetic core.

4. The method of claim 3, comprising defining a lateral extent of the laminated magnetic core by top-down machining after completing deposition or bottom-up through-mold electrodeposition using a mold material that is intact throughout deposition.

5. The method of claim 3, comprising rinsing and drying the laminated magnetic core.

6. The method of claim 3, comprising applying one or more processes that reduce the interlamination layer conductivity.

7. The method of claim 1, wherein the partially conducting material comprises a conductive polymer, and wherein depositing the interlamination layer comprises anodic electropolymerization of the conductive polymer.

8. The method of claim 1, wherein the partially conducting material comprises a conductive polymer, and wherein depositing the interlamination layer comprises dip, spin, or spray coating the conductive polymer.

9. The method of claim 1, wherein the first and second magnetic layers comprise a magnetic alloy, and wherein depositing the first and second magnetic layers comprises cathodic electrodeposition of the magnetic alloy.

10. The method of claim 9, wherein depositing each of the first and second magnetic layers comprises pre-electrodeposition of a conductive, low deposition potential metal film having a thickness less than a thickness of the first and second magnetic layers.

11. The method of claim 1 comprising applying a magnetic field during deposition of the first magnetic layer or the second magnetic layer or both.

\* \* \* \* \*